US012808092B2

(12) United States Patent
Sahni et al.

(10) Patent No.: US 12,808,092 B2
(45) Date of Patent: Nov. 24, 2026

(54) CORE-SHEATH FILAMENTS INCLUDING POLYISOBUTYLENE COMPOSITIONS AND METHODS OF PRINTING THE SAME

(71) Applicant: 3M INNOVATIVE PROPERTIES COMPANY, St. Paul, MN (US)

(72) Inventors: Vasav Sahni, St. Paul, MN (US); Mark W. Emerson, Oakdale, MN (US); Jacob D. Young, St. Paul, MN (US); Shaun M. West, St. Paul, MN (US); Thomas Q. Chastek, St. Paul, MN (US); Jason D. Clapper, Lino Lakes, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/634,484

(22) PCT Filed: Aug. 18, 2020

(86) PCT No.: PCT/IB2020/057778

§ 371 (c)(1),
(2) Date: Feb. 10, 2022

(87) PCT Pub. No.: WO2021/033138

PCT Pub. Date: Feb. 25, 2021

(65) Prior Publication Data

US 2022/0298676 A1 Sep. 22, 2022

Related U.S. Application Data

(60) Provisional application No. 62/889,647, filed on Aug. 21, 2019.

(51) Int. Cl.
*D01F 8/06* (2006.01)
*B29C 64/118* (2017.01)
(Continued)

(52) U.S. Cl.
CPC .............. *D01F 8/06* (2013.01); *B29C 64/118* (2017.08); *B33Y 70/00* (2014.12); *C09J 5/06* (2013.01);
(Continued)

(58) Field of Classification Search
CPC ..... D01F 8/06; D01F 1/10; C09J 11/06; C09J 123/22; C09J 2301/302; C09J 2301/304; D01D 5/34
(Continued)

(56) References Cited

U.S. PATENT DOCUMENTS 4,490,424 A 12/1984 Gerace
5,041,248 A * 8/1991 Renlund .................. D01F 9/08 264/235.6
(Continued)

FOREIGN PATENT DOCUMENTS

JP 01308471 12/1989
WO WO 2005-005701 1/2005
(Continued)

OTHER PUBLICATIONS

"Polyisobutylene as a Base Polymer and Modifier for Adhesives and Sealants", www.specialchem.com, Apr. 11, 2007. (Year: 2007).*
(Continued)

*Primary Examiner* — Jennifer A Boyd
(74) *Attorney, Agent, or Firm* — Ann Benjamin

(57) ABSTRACT

Provided are amorphous polyolefin compositions that can be dispensed digitally as the core in a core-sheath construction. These formulations provide dependable adhesion to both polar and non-polar surface in addition to providing a high barrier to air and moisture which is beneficial in many applications. These formulations and the method of processing these formulations provide many benefits, including low VOCs, avoiding die cutting, design flexibility, achieving
(Continued)

intricate nonplanar bonding patterns, printing on thin and/or delicate substrates, and printing on an irregular and/or complex topography, no need for release liners or low-adhesion backsize, and no need for a post-processing step.

12 Claims, 1 Drawing Sheet

(51) Int. Cl.

| | |
|---|---|
| ***B29K 23/00*** | (2006.01) |
| ***B29K 105/00*** | (2006.01) |
| ***B33Y 70/00*** | (2020.01) |
| ***C09J 5/06*** | (2006.01) |
| ***C09J 11/06*** | (2006.01) |
| ***C09J 123/22*** | (2006.01) |
| ***D01D 5/34*** | (2006.01) |
| ***D01F 1/10*** | (2006.01) |

(52) U.S. Cl.

CPC ............ *C09J 11/06* (2013.01); *C09J 123/22* (2013.01); *D01D 5/34* (2013.01); *D01F 1/10* (2013.01); *B29K 2023/0633* (2013.01); *B29K 2023/18* (2013.01); *B29K 2105/0088* (2013.01); *C09J 2301/302* (2020.08); *C09J 2301/304* (2020.08); *C09J 2423/00* (2013.01); *D10B 2321/021* (2013.01); *D10B 2401/04* (2013.01); *D10B 2505/00* (2013.01)

(58) Field of Classification Search

USPC ........................................................ 428/373

See application file for complete search history.

(56) References Cited

U.S. PATENT DOCUMENTS

| | | | | |
|---|---|---|---|---|
| 7,773,834 | B2 | 8/2010 | Ouderkirk | |
| 8,431,065 | B2 | 4/2013 | Jacob | |
| 8,460,969 | B2 | 6/2013 | Krawinkel | |
| 8,771,459 | B2 | 7/2014 | Keite-Telgenbuscher | |
| 9,487,684 | B2 | 11/2016 | Krawinkel | |
| 9,567,497 | B2 | 2/2017 | Kopf | |
| 11,434,587 | B2 * | 9/2022 | Kopping | B33Y 10/00 |
| 2003/0171054 | A1 * | 9/2003 | Bansal | B32B 5/26 442/364 |
| 2005/0196612 | A1 | 9/2005 | Flood | |
| 2008/0221291 | A1 | 9/2008 | Invie | |
| 2009/0026934 | A1 | 1/2009 | Fujita | |
| 2011/0292493 | A1 | 12/2011 | Danner | |
| 2013/0207922 | A1 | 8/2013 | Gillmore | |
| 2014/0141271 | A1 | 5/2014 | Uemura | |
| 2014/0315016 | A1 | 10/2014 | Dollase | |
| 2014/0322526 | A1 | 10/2014 | Dollase | |
| 2015/0090573 | A1 | 4/2015 | Mansky | |
| 2015/0240133 | A1 | 8/2015 | Nakayama | |
| 2015/0299519 | A1 | 10/2015 | Nishijima | |
| 2015/0299523 | A1 | 10/2015 | Park | |
| 2019/0144715 | A1 | 5/2019 | Iwase | |
| 2020/0061944 | A1 * | 2/2020 | Liao | C08K 3/011 |
| 2022/0315753 | A1 * | 10/2022 | Kennedy | C08L 53/00 |

FOREIGN PATENT DOCUMENTS

| | | | |
|---|---|---|---|
| WO | WO 2008-112452 | 9/2008 | |
| WO | WO 2015-048293 | 4/2015 | |
| WO | WO 2015-195527 | 12/2015 | |
| WO | WO-2016080573 A1 * | 5/2016 | C08L 101/00 |
| WO | WO 2017-009190 | 1/2017 | |
| WO | WO-2018108639 A1 * | 6/2018 | B29C 64/40 |
| WO | WO 2018-178850 | 10/2018 | |
| WO | WO 2018-199959 | 11/2018 | |
| WO | WO 2021-033064 | 2/2021 | |

OTHER PUBLICATIONS

Turner, "A review of melt extrusion additive manufacturing processes: I. process design and modeling"; Rapid Prototyping Journal, 2014, vol. 20, No. 3, pp. 192-204.

Park, "Curing Behavior and Adhesion Performance of UV-Curable Styrene—Isoprene—Styrene-Based Pressure-Sensitive Adhesives", Journal of Adhesion Science and Technology, 2008, vol. 22, No. 13, pp. 1401-1423.

International Search Report for PCT International Application No. PCT/IB2020/057778, mailed on Oct. 23, 2020, 3 pages.

* cited by examiner

CORE-SHEATH FILAMENTS INCLUDING POLYISOBUTYLENE COMPOSITIONS AND METHODS OF PRINTING THE SAME

CROSS REFERENCE TO RELATED APPLICATIONS

This application is a national stage filing under 35 U.S.C. § 371 of PCT/IB2020/057778, filed Aug. 18, 2020, which claims the benefit of Provisional Application No. 62/889,647, filed Aug. 21, 2019, the disclosure of which is incorporated by reference in its/their entirety herein.

TECHNICAL FIELD

Background

The use of fused filament fabrication ("FFF") to produce three-dimensional articles has been known for a relatively long time, and these processes are generally known as methods of so-called 3D printing (or additive manufacturing). In FFF, a plastic filament is melted in a moving printhead to form a printed article in a layer-by-layer, additive manner. The filaments are often composed of polylactic acid, nylon, polyethylene terephthalate (typically glycol-modified), or acrylonitrile butadiene styrene.

SUMMARY

The present disclosure describes amorphous polyolefin compositions that can be dispensed digitally. These formulations can be dispensed as the core in a core-sheath construction. These formulations provide dependable adhesion to both polar and non-polar surface in addition to providing a high barrier to air and moisture which is beneficial in many applications. These formulations and the method of processing these formulations provide at least the following benefits: low VOCs, avoiding die cutting, design flexibility, achieving intricate nonplanar bonding patterns, printing on thin and/or delicate substrates, and printing on an irregular and/or complex topography, no need for release liners or low-adhesion backsize, and no need for a post-processing step (e.g., heating, UV irradiation).

In a first aspect, provided is a core-sheath filament comprising:

- a non-tacky sheath, wherein the non-tacky sheath exhibits a melt flow index of less than 15 grams per 10 minutes (g/10 min); and
- an adhesive core, wherein the adhesive core comprises:
  - a polyisobutylene polymer having a weight average molecular weight of 125000 grams per mole (g/mol) to 800000 g/mol.

In another aspect, provided is an adhesive composition comprising the core-sheath filament of the present disclosure, the adhesive composition being a product resulting from compounding the core-sheath filament through a heated extruder nozzle.

In another aspect provided is a method of making a core-sheath filament, the method comprising:

a) forming a core composition comprising the adhesive core of the present disclosure;

b) forming a sheath composition comprising a non-tacky thermoplastic material; and c) wrapping the sheath composition around the core composition to form the core-sheath filament, wherein the core-sheath filament has an average longest cross-sectional distance in a range of 1 to 20 millimeters.

Features and advantages of the present disclosure will be further understood upon consideration of the detailed description as well as the appended claims.

Figure 1:
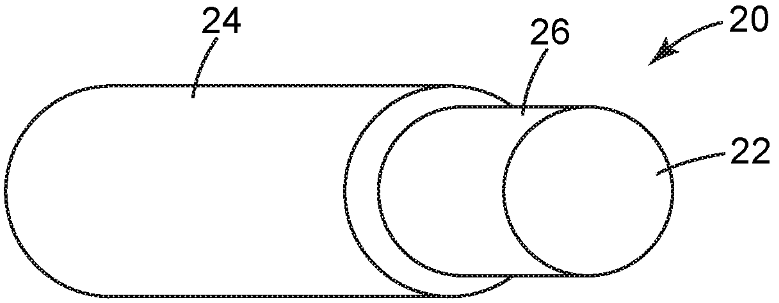
FIG. 1 is a schematic perspective exploded view of a section of a core-sheath filament, according to an embodiment of the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Adhesive transfer tapes have been used extensively for adhering a first substrate to a second substrate. Adhesive transfer tapes are typically provided in rolls and contain a pressure-sensitive adhesive layer positioned on a release liner or between two release liners, and because transfer adhesive tapes often need to be die-cut to the desired size and shape prior to application to a substrate, the transfer adhesive tape that is outside the die-cut area is discarded as waste. The core-sheath filaments described herein can be used to deliver a pressure-sensitive adhesive (also referred to herein as a "hot-melt processable adhesive") without the use of a release liner and with less waste. The non-tacky sheath allows for easy handling of the hot-melt processable adhesive before deposition on a substrate. Furthermore, the use of the core-sheath filaments described herein as the adhesive composition can substantially reduce the waste often associated with adhesive transfer tapes as no die-cutting is required because the adhesive is deposited only in the desired area.

The disclosed core-sheath filaments can be used for printing a hot-melt processable adhesive using fused filament fabrication ("FFF"). The material properties needed for FFF dispensing typically are significantly different than those required for hot-melt dispensing of a pressure-sensitive adhesive composition. For instance, in the case of traditional hot-melt adhesive dispensing, the adhesive is melted into a liquid inside a tank and pumped out through a hose and nozzle. Thus, traditional hot-melt adhesive dispensing requires a low-melt viscosity adhesive, which is often quantified as a high melt flow index ("MFI") adhesive. If the viscosity is too high (or the MFI is too low), the hot-melt adhesive cannot be effectively transported from the tank to the nozzle. In contrast, FFF involves melting a filament only within a nozzle at the point of dispensing, and therefore is not limited to low melt viscosity adhesives (high melt flow index adhesives) that can be easily pumped. In fact, a high melt viscosity adhesive (a low melt flow index adhesive) can advantageously provide geometric stability of a hot-melt processable adhesive after dispensing, which allows for precise and controlled placement of the adhesive as the adhesive does not spread excessively after being printed.

In addition, suitable filaments for FFF typically need at least a certain minimum tensile strength so that large spools of filament can be continuously fed to a nozzle without breaking. The FFF filaments are usually spooled into level wound rolls. When filaments are spooled into level wound rolls, the material nearest the center can be subjected to high compressive forces. Preferably, the core-sheath filament is resistant to permanent cross-sectional deformation (i.e., compression set) and self-adhesion (i.e., blocking during storage).

Provided herein are adhesive systems including pressure-sensitive adhesives ("PSA") that are hot-melt processable, i.e., hot-melt processable adhesives. The hot-melt processable adhesives are in a filament core/sheath form factor having a core and a non-tacky sheath. Delivery of the hot-melt processable adhesives can be completed via hot-melt dispense including techniques used in filament-based additive manufacturing.

The disclosed core-sheath filaments include a core that is encapsulated by a sheath that prevents the wound filament from sticking to itself, enables easy unwind during additive manufacturing and other dispensing, and provides structural integrity such that the core-sheath filaments can be advanced to a heated extruder nozzle by mechanical means. Typically, the sheath is thin, has a composition such that it melts and mixes homogenously with the hot-melt processable adhesive core at the printer/extruder nozzle before application onto substrates, and has no surface tackiness at normal storage conditions.

The polyisobutylene-based adhesives disclosed herein provide certain unique attributes including, for example, hot-melt processability, high barrier to oxygen and moisture, low and stable dielectric constant, high tack, and optical clarity. These attributes provide performance advantages to the intended applications of the compositions described herein.

Core-Sheath Filaments

Figure 2:
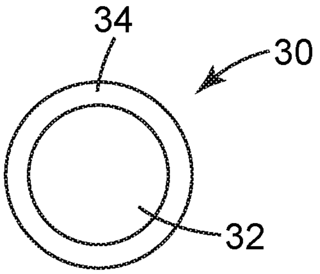
FIG. 2 is a schematic cross-sectional view of a core-sheath filament, according to an embodiment of the present disclosure.

An example core-sheath filament 20 is shown schematically in FIG. 1. The filament includes a core 22 and a sheath 24 surrounding (encasing) the outer surface 26 of the core 22. FIG. 2 shows the core-sheath filament 30 in a cross-sectional view. The core 32 is surrounded by the sheath 34. Any desired cross-sectional shape can be used for the core. For example, the cross-sectional shape can be a circle, oval, square, rectangular, triangular, or the like. The cross-sectional area of the core 32 is typically larger than the cross-sectional area of the sheath 34.

The core-sheath filament usually has a relatively narrow longest cross-sectional distance (e.g., diameter for cores that have a circular cross-sectional shape) so that it can use used in applications where precise deposition of an adhesive is needed or advantageous. For instance, the core-sheath filament usually has an average longest cross-sectional distance in a range of 1 to 20 millimeters (mm). The average longest cross-sectional distance of the filament can be at least 1 mm, at least 2 mm, at least 3 mm, at least 4 mm, at least 5 mm, at least 6 mm, at least 8 mm, or at least 10 mm and can be up to 20 mm, up to 18 mm, up to 15 mm, up to 12 mm, up to 10 mm, up to 8 mm, up to 6 mm, or up to 5 mm. This average length can be, for example, in a range of 2 to 20 mm, 5 to 15 mm, or 8 to 12 mm.

Often, 1 to 10 percent of the longest cross-sectional distance (e.g., diameter) of the core-sheath filament is the sheath and 90 to 99 percent of the longest cross-sectional distance (e.g., diameter) of the core-sheath filament is the core. For example, up to 10 percent, up to 8 percent, up to 6 percent, or up to 4 percent and at least 1 percent, at least 2 percent, or at least 3 percent of the longest cross-sectional distance can be due to the sheath with the remainder being attributable to the core. The sheath extends completely around the core to prevent the core from sticking to itself. In some embodiments, however, the ends of the filament may contain only the core.

Often, the core-sheath filament has an aspect ratio of length to longest cross-sectional distance (e.g., diameter) of 50:1 or greater, 100:1 or greater, or 250:1 or greater. Core-sheath filaments having a length of at least about 20 feet (6 meters) can be useful for printing a hot-melt processable adhesive. Depending on the application or use of the core-sheath filament, having a relatively consistent longest cross-sectional distance (e.g., diameter) over its length can be desirable. For instance, an operator might calculate the amount of material being melted and dispensed based on the expected mass of filament per predetermined length; but if the mass per length varies widely, the amount of material dispensed may not match the calculated amount. In some embodiments, the core-sheath filament has a maximum variation of longest cross-sectional distance (e.g., diameter) of 20 percent over a length of 50 centimeters (cm), or even a maximum variation in longest cross-sectional distance (e.g., diameter) of 15 percent over a length of 50 cm.

Core-sheath filaments described herein can exhibit a variety of desirable properties, both as prepared and as a hot-melt processable adhesive composition. As formed, a core-sheath filament desirably has strength consistent with being handled without fracturing or tearing of the sheath. The structural integrity needed for the core-sheath filament varies according to the specific application of use. Preferably, a core-sheath filament has strength consistent with the requirements and parameters of one or more additive manufacturing devices (e.g., 3D printing systems). One additive manufacturing apparatus, however, could subject the core-sheath filament to a greater force when feeding the filament to a deposition nozzle than a different apparatus.

Advantageously, the elongation at break of the sheath material of the core-sheath filament is typically 50 percent or greater, 60 percent or greater, 80 percent or greater, 100 percent or greater, 250 percent or greater, 400 percent or greater, 750 percent or greater, 1000 percent or greater, 1400 percent or greater, or 1750 percent or greater and 2000 percent or less, 1500 percent or less, 900 percent or less, 500 percent or less, or 200 percent or less. Stated another way, the elongation at break of the sheath material of the core-sheath filament can range from 50 percent to 2000 percent. In some embodiments, the elongation at break is at least 60 percent, at least 80 percent, or at least 100 percent. Elongation at break can be measured, for example, by the methods outlined in ASTM D638-14, using test specimen Type IV.

Advantages provided by at least certain embodiments of employing the core-sheath filament as a pressure-sensitive adhesive once it is melted and mixed include one or more of: low volatile organic compound ("VOC") characteristics, avoiding die cutting, design flexibility, achieving intricate non-planar bonding patterns, printing on thin and/or delicate substrates, and printing on an irregular and/or complex topography.

Any suitable method known to those of skill in the relevant arts can be used to prepare the core-sheath filaments. Most methods include forming a core composition that is a hot-melt processable adhesive. The hot-melt processable adhesive in the core includes a polyisobutylene polymer having a weight average molecular weight of 125000 grams per mole (g/mol) to 800000 g/mol. These methods further include forming a sheath composition comprising a non-tacky thermoplastic material. These methods still further include wrapping the sheath composition around the core composition.

In many embodiments, the method of making the core-sheath filament includes co-extruding the core composition and the sheath composition through a coaxial die such that the sheath composition surrounds the core composition. Optional additives for the core composition, which is a hot-melt processable adhesive, can be added in an extruder (e.g., a twin-screw extruder) equipped with a side stuffer that allows for the inclusion of additives. Similarly, optional additives can be added to a sheath composition in the extruder. The hot-melt processable adhesive core can be extruded through the center portion of a coaxial die having an appropriate longest cross-sectional distance (i.e., diameter) while the non-tacky sheath can be extruded through the outer portion of the coaxial die. One suitable die is a filament spinning die as described in U.S. Pat. No. 7,773,834 (Ouderkirk et al.). Optionally, the filament can be cooled upon extrusion using a water bath. The filament can be lengthened using a belt puller. The speed of the belt puller can be adjusted to achieve a desired filament cross-sectional distance (e.g., diameter).

In other embodiments, the core can be formed by extrusion of the core composition. The resulting core can be rolled within a sheath composition having a size sufficient to surround the core. In still other embodiments, the core composition can be formed as a sheet. A stack of the sheets can be formed having a thickness suitable for the filament. A sheath composition can be positioned around the stack such that the sheath composition surrounds the stack.

Suitable components of the core-sheath filament are described in detail below.

Sheath

The sheath provides structural integrity to the core-sheath filament, as well as separating the adhesive core so that it does not adhere to itself (such as when the filament is provided in the form of a spool or roll) or so that is does not prematurely adhere to another surface. The sheath it typically selected to be thick enough to support the filament form factor and to allow for delivery of the core-sheath filament to a deposition location. On the other hand, the thickness of the sheath is selected so that its presence does not adversely affect the overall adhesive performance of the core-sheath filament.

The sheath material is typically selected to have a melt flow index ("MFI") that is less than or equal to 15 grams/10 minutes when measured in accord with ASTM D1238 at 190° C. and a load of 2.16 kilograms. Such a low melt flow index is indicative of a sheath material that has sufficient strength (robustness) to allow the core-sheath filament to withstand the physical manipulation required for handling such as for use with an additive manufacturing apparatus. During such processes, the core-sheath filament often needs to be unwound from a spool, introduced into the additive manufacturing apparatus, and then advanced into a nozzle for melting and blending without breaking. Compared to sheath materials with a higher melt flow index, the sheath materials with a melt flow index that is less than or equal to 15 grams/10 minutes are less prone to breakage (tensile stress fracture) and can be wound into a spool or roll having a relatively small radius of curvature. In certain embodiments, the sheath material exhibits a melt flow index of 14 grams/10 minutes or less, 13 grams/10 minutes or less, 11 grams/10 minutes or less, 10 grams/10 minutes or less, 8 grams/10 minutes or less, 7 grams/10 minutes or less, 6 grams/10 minutes or less, 5 grams/10 minutes or less, 4 grams/10 minutes or less, 3 grams/10 minutes or less, 2 grams/10 minutes or less, or 1 grams/10 minutes or less. If desired, various sheath materials can be blended (e.g., melted and blended) together to provide a sheath composition having the desired melt flow index.

Low melt flow index values tend to correlate with high melt viscosities and high molecular weight. Higher molecular weight sheath materials tend to result in better mechanical performance. That is, the sheath materials tend to be more robust (i.e., the sheath materials are tougher and less likely to undergo tensile stress fracture). This increased robustness is often the result of increased levels of polymer chain entanglements. The higher molecular weight sheath materials are often advantageous for additional reasons. For example, these sheath materials tend to migrate less to adhesive/substrate interface in the final article; such migration can adversely affect the adhesive performance, especially under aging conditions. In some cases, however, block copolymers with relatively low molecular weights can behave like high molecular weight materials due to physical crosslinks. That is, the block copolymers can have low MFI values and good toughness despite their relatively low molecular weights.

As the melt flow index is lowered (such as to less than or equal to 15 grams/10 minutes), less sheath material is required to obtain the desired mechanical strength. That is, the thickness of the sheath layer can be decreased and its contribution to the overall longest cross-sectional distance (e.g., diameter) of the core-sheath filament can be reduced. This is advantageous because the sheath material may adversely impact the adhesive properties of the core pressure-sensitive adhesive if it is present in an amount greater than about 10 weight percent of the total weight of the filament.

For application to a substrate, the core-sheath filament is typically melted and mixed together before deposition on the substrate. The sheath material desirably is blended with the hot-melt processable adhesive in the core without adversely impacting the performance of the hot-melt processable adhesive. To blend the two compositions effectively, it is often desirable that the sheath composition is compatible with the core composition.

If the core-sheath filament is formed by co-extrusion of the core composition and the sheath composition, the melt viscosity of the sheath composition is desirably selected to be fairly similar to that of the core composition. If the melt viscosities are not sufficiently similar (such as if the melt viscosity of the core composition is significantly lower than that of the sheath composition), the sheath may not surround the core in the filament. The filament can then have exposed core regions and the filament may adhere to itself. Additionally, if the melt viscosity of the sheath core composition is significantly higher than the core composition, during melt blending of the core composition and the sheath composition during dispensing, the non-tacky sheath may remain exposed (not blended sufficiently with the core) and adversely impact formation of an adhesive bond with the substrate. The melt viscosities of the sheath composition to the melt viscosity of the core composition is in a range of 100:1 to 1:100, in a range of 50:1 to 1:50, in a range of 20:1 to 1:20, in a range of 10:1 to 1:10, or in a range of 5:1 to 1:5. In many embodiments, the melt viscosity of the sheath composition is greater than that of the core composition. In such situations, the viscosity of the sheath composition to the core composition is typically in a range of 100:1 to 1:1, in a range of 50:1 to 1:1, in a range of 20:1 to 1:1, in a range of 10:1 to 1:1, or in a range of 5:1 to 1:1.

In addition to exhibiting strength, the sheath material is non-tacky. A material is non-tacky if it passes a "Self-Adhesion Test", in which the force required to peel the material apart from itself is at or less than a predetermining maximum threshold amount, without fracturing the material. Employing a non-tacky sheath allows the filament to be handled and optionally printed, without undesirably adhering to anything prior to deposition onto a substrate.

In certain embodiments, the sheath material exhibits a combination of at least two of low MFI (e.g., less than or equal to 15 grams/10 minutes), moderate elongation at break (e.g., 100% or more as determined by ASTM D638-14 using test specimen Type IV), low tensile stress at break (e.g., 10 MPa or more as determined by ASTM D638-14 using test specimen Type IV), and moderate Shore D hardness (e.g., 30-70 as determined by ASTM D2240-15). A sheath having at least two of these properties tends to have the toughness suitable for use in FFF-type applications.

In some embodiments, to achieve the goals of providing structural integrity and a non-tacky surface, the sheath comprises a material selected from styrenic copolymers (e.g., styrenic block copolymers such as styrene-butadiene block copolymers), polyolefins (e.g., polyethylene, polypropylene, and copolymers thereof), ethylene vinyl acetates, polyurethanes, ethylene methyl acrylate copolymers, ethylene (meth)acrylic acid copolymers, nylon, (meth)acrylic block copolymers, poly(lactic acid), anhydride modified ethylene acrylate resins, and the like. Depending on the method of making the core-sheath filament, it may be advantageous to at least somewhat match the polarity of the sheath polymeric material with that of the polymer in the core.

Suitable styrenic materials for use in the sheath are commercially available and include, for example and without limitation, styrenic materials under the trade designation KRATON (e.g., KRATON D116 P, D1118, D1119, and A1535) from Kraton Performance Polymers (Houston, TX, USA), under the trade designation SOLPRENE (e.g., SOLPRENE S-1205) from Dynasol (Houston, TX, USA), under the trade designation QUINTAC from Zeon Chemicals (Louisville, KY, USA), under the trade designations VECTOR and TAIPOL from TSRC Corporation (New Orleans, LA, USA), and under the trade designations K-RESIN (e.g., K-RESIN DK11) from Ineos Styrolution (Aurora, IL, USA).

Suitable polyolefins are not particularly limited. Suitable polyolefin resins include for example and without limitation, polypropylene (e.g., a polypropylene homopolymer, a polypropylene copolymer, and/or blends comprising polypropylene), polyethylene (e.g., a polyethylene homopolymer, a polyethylene copolymer, high density polyethylene ("HDPE"), medium density polyethylene ("MDPE"), low density polyethylene ("LDPE"), and combinations thereof. For instance, suitable commercially available LDPE resins include PETROTHENE NA217000 available from LyondellBasell (Rotterdam, Netherlands) with a MFI of 5.6 grams/10 minutes, MARLEX 1122 available from Chevron Phillips (The Woodlands, TX) Suitable HDPE resins include ELITE 5960G from Dow Chemical Company (Midland, MI, USA) and HDPE HD 6706 series from ExxonMobil (Houston, TX, USA). Polyolefin block copolymers are available from Dow Chemical under the trade designation INFUSE (e.g., INFUSE 9807).

Suitable commercially available thermoplastic polyurethanes include for instance and without limitation, ESTANE 58213 and ESTANE ALR 87A available from the Lubrizol Corporation (Wickliffe, OH)

Suitable ethylene vinyl acetate ("EVA") polymers (i.e., copolymers of ethylene with vinyl acetate) for use in the sheath include resins from Dow, Inc. (Midland, MI) available under the trade designation ELVAX. Typical grades range in vinyl acetate content from 9 to 40 weight percent and a melt flow index of as low as 0.3 grams per 10 minutes. (per ASTM D1238). One exemplary material is ELVAX 3135 SB with a MFI of 0.4 grams per 10 minutes. Suitable EVAs also include high vinyl acetate ethylene copolymers from LyondellBasell (Houston, TX) available under the trade designation ULTRATHENE. Typical grades range in vinyl acetate content from 12 to 18 weight percent. Suitable EVAs also include EVA copolymers from Celanese Corporation (Dallas, TX) available under the trade designation ATEVA. Typical grades range in vinyl acetate content from 2 to 26 weight percent.

Suitable nylon materials for use in the sheath include a nylon terpolymeric material from Nylon Corporation of America under the trade designation NYCOA CAX.

Suitable poly(ethylene methyl acrylate) for use in the sheath include resins from Dow Inc. (Midland, MI, USA) under the trade designation ELVALOY (e.g., ELVALOY 1330 with 30 percent methyl acrylate and a MFI of 3.0 grams/10 minutes, ELVALOY 1224 with 24 percent methyl acrylate and a MFI of 2.0 grams/10 minutes, and ELVALOY 1609 with 9 percent methyl acrylate and a MFI of 6.0 grams/10 minutes).

Suitable anhydride modified ethylene acrylate resins are available from Dow under the trade designation BYNEL such as BYNEL 21E533 with a MFI of 7.3 grams/10 minutes and BYNEL 30E753 with a MFI of 2.1 grams/10 minutes.

Suitable ethylene (meth)acrylic copolymers for use in the sheath include resins from Dow, Inc. under the trade designation NUCREL (e.g., NUCREL 925 with a MFI of 25.0 grams/10 minutes and NUCREL 3990 with a MFI of 10.0 grams/10 minutes).

Suitable (meth)acrylic block copolymers for use in the sheath include block copolymers from Kuraray (Chiyoda-ku, Tokyo, JP) under the trade designation KURARITY (e.g., KURARITY LA2250 and KURAITY LA4285). KURARITY LA2250, which has a MFI of 22.7 grams/10 minutes, is an ABA block copolymer with poly(methyl methacrylate) as the A blocks and poly(n-butyl acrylate) as the B block. About 30 weight percent of this polymer is poly(methyl methacrylate). KURAITY LA4285, which has a MFI of 1.8 grams/10 minutes, is an ABA block copolymer with poly(methyl methacrylate) as the A blocks and poly(n-butyl acrylate as the B block. About 50 weight percent of this polymer is poly(methyl methacrylate). Varying the amount of poly(methyl methacrylate) in the block copolymer alters its glass transition temperature and its toughness.

Suitable poly(lactic acid) for use in the sheath include those available from Natureworks, LLC (Minnetonka, NM, USA) under the trade designation INGEO (e.g., INGEO 6202D Fiber grade).

The sheath typically makes up 1 to 10 weight percent of the total weight of the core-sheath filament. The amount can be at least 1 weight percent, at least 2 weight percent, at least 3 weight percent, at last 4 weight percent, at least 5 weight percent and up to 10 weight percent, up to 9 weight percent, up to 8 weight percent, up to 7 weight percent, up to 6 weight percent, or up to 5 weight percent.

Core

Cores of the present disclosure may be prepared by processes known to those of ordinary skill in the relevant arts and include a polyisobutylene polymer having a weight average molecular weight of 125000 grams per mole (g/mol) to 800000 g/mol based on a total weight of the core. Such polyisobutylene polymers may be homopolymers and/or copolymers. Unless specified otherwise, as used herein "polyisobutylene polymer" refers to both the homopolymer and copolymer.

In some embodiments, the adhesive composition is a pressure sensitive adhesive before and/or after crosslinking the multifunctional component. Pressure sensitive adhesives are often characterized as having a storage modulus (G') at the application temperature, typically room temperature (e.g. 25° C.), of less than $3\times10^5$ Pa (0.3 MPa) at a frequency of 1 Hz. As used herein, storage modulus (G') and tan delta refers to the value obtained utilizing Dynamic Mechanical Analysis (DMA) per the test method described in the example. In some embodiments, the pressure sensitive adhesive composition has a storage modulus of less than $2\times10^5$ Pa, $1\times10^5$ Pa, $9\times10^4$ Pa, $8\times10^4$ Pa, $7\times10^4$ Pa, $6\times10^4$ Pa, $5\times10^4$ Pa, $4\times10^4$ Pa, or $3\times10^4$ Pa. In some embodiments, the composition has a storage modulus (G') of at least $2\times10^4$ Pa, $3\times10^4$ Pa, or $4\times10^4$ Pa. In some embodiments, the pressure sensitive adhesive has a tan delta no greater than 0.7, 0.6, 0.5, or 0.4 at 70° C. The pressure sensitive adhesive composition typically has tan delta of at least 0.01 or 0.05 at 70° C.

Pressure sensitive adhesives are often characterized as having a glass transition temperature "Tg" below 25° C.; whereas other adhesives may have a Tg of 25° C. or greater, typically ranging up to 50° C. As used herein, Tg refers to the value obtained utilizing Dynamic Mechanical Analysis (DMA) per the test method described in the examples. In some embodiments, the pressure sensitive adhesive composition has a Tg no greater than 20° C., 15° C., 10° C., 5° C., 0° C., or −5° C. The Tg of the pressure sensitive adhesive is typically at least −40° C., −35° C., −30° C., −25° C., or −20° C.

Pressure sensitive adhesive are often characterized as having adequate adhesion. In some embodiments, the peel adhesion (e.g. to glass), as measured according to the test method described in the examples, is at least 0.1, 0.5, 1, 2, 3, 4, or 5 N/cm ranging up to for example 15, 16, 17, 18, 19, or 20 N/dm, or greater.

In some embodiments, the adhesive core comprises a polyisobutylene polymer comprising at least 90, 91, 92, 93, 94, 95, 96, 97, 98, or 99 mole-% of polymerized units of isobutylene.

In other embodiments, the adhesive core comprises a polyisobutylene copolymer that comprises at least 50, 55 or 60 mole-% of polymerized units of polyisobutylene. In some embodiments, the copolymer further comprises polymerized units derived from 1-butene and/or 2-butene. The polymerized units derived from 1-butene and/or 2-butene are typically present in an amount of at least 1, 5, 10, 15 or 20 mole-% ranging up to 30, 35, 40, 45 or 50 wt.-% of the polyisobutylene copolymer. Polyisobutylene copolymers further comprising polymerized units derived from 1-butene and/or 2-butene may be characterized as "polybutene".

In other examples, polyisobutylene copolymers include copolymers of isobutylene and isoprene, copolymers of isobutylene and butadiene, and halogenated butyl rubbers obtained by brominating or chlorinating these copolymers. However, the polyisobutylene copolymers can be free of halogenated butyl rubbers, the halogen (e.g. chloride, bromide) content being less than 1, 0.5, 0.25, 0.1, 0.01, or 0.001 mole percent of the polyisobutylene polymer.

In some embodiments, the polyisobutylene polymer may be characterized as butyl rubber. Butyl rubber is a copolymer of isobutylene and a small amount of isoprene, providing for a highly saturated backbone. In some embodiments, the mol % of isoprene of the butyl rubber is at least 0.5 or 1 mol %. In some embodiments, the mol % of isoprene of the butyl rubber is no greater than 3, 2.5, 2 or 1.5 mol %. In some embodiments, the Mooney viscosity ML 1+8- at 125° C. (ASTM D1646) of the butyl rubber is typically at least 25, 30, 35, or 40. In some embodiments, the Mooney viscosity ML 1+8- at 125° C. of the butyl rubber is typically no greater than 60 or 55. Butyl rubber is commercially available from various suppliers such as Exxon.

The polyisobutylene copolymer typically does not contain a structural unit derived from styrene. Further, the polyisobutylene copolymers are typically random copolymers. In typical embodiments, the adhesive composition does not comprise block copolymers such as styrene-isoprene-styrene (SIS), styrene-butadiene-styrene (SBS), and styrene-isobutylene-styrene (SIBS) block copolymers.

Polyisobutylene polymer(s) can contain a trace amount of C8-C28 oligomers. The concentration of such is generally less than 0.15, 0.10, or 0.05 wt.-% based on the total weight of the polyisobutylene polymer.

It is appreciated that the polyisobutylene polymer(s) may have a very small concentration of reactive double bonds or other functional groups that are residual of the polymerization method of making the polyisobutylene polymer. The concentration of such reactive double bonds or other functional groups is typically less than 5, 4, 3, or 2 mole %.

Polyisobutylene polymer(s) typically have a density of 0.92 g/cc. However, depending on the content of 1-butene and/or 2-butene and/or other alkene comonomer(s), the density may be 0.91 or lower. Further, the glass transition temperature of such polymers is typically −64° C. to −65° C. as measured by Differential Scanning calorimetry (DSC). Polyisobutylene polymer(s) typically cold flow at room temperature.

Thus, depending on the selection of polyisobutylene polymer(s), the adhesive core comprises at least 50, 55, 60, 65, 70, 75, 80, 85, 90, 95 wt.-% or greater of polymerized units of polyisobutylene.

Polyisobutylene polymers are commercially available from several manufacturers. Homopolymers are commercially available, for example, under the trade designation OPPANOL (e.g., OPPANOL B12, B15, B30, B50, B80, B100, B150, B200, N80, N100, N150) from BASF Corp. (Florham Park, NJ). These polymers often have a weight average molecular weight in the range of about 40,000 to 1,000,000 g/mole or greater. Still other polyisobutylene polymers are commercially available in a wide range of molecular weights from United Chemical Products (UCP) of St. Petersburg, Russia; Exxon Chemical Company as the trade designation VISTANEX™; and B.F. Goodrich as the trade designation "Hycar". Such polyisobutylene polymers are characterized as unfunctional polyisobutylene polymers, lacking functional groups such as amine, imide, anhydride, (meth)acrylate and vinyl ether.

In some embodiments, the adhesive core comprises polyisobutylene ("PIB") polymers that include functional groups. Various functionalized PIB materials are commercially available. For example, polyisobutyleneamine having a number average molecular weight (Mn) of about 1,000 grams/mole and a molar mass distribution Mw/Mn=1.6) is commercially available from BASF Corporation (Florham Park, N.J.) under the trade designation "KEROCOM PIBA03". Further, polyisobutene succinimide is available from BASF under the trade designation "KEROCOM PIB SI". An anhydride-terminated polyisobutylene (Mn) of about 1,000 grams/mole) is available from BASF under the trade designation "GLISSOPAL SA". Such materials can optionally be present in the adhesive composition at a concentration ranging from 1, 2, 3, 4, 5, 6, 7, 8, 9, or 10 wt.-% ranging up to 40 wt.-% of the adhesive composition. Depending on the functional group, the polyolefin copolymer may or may not be covalently bonded to the functional polyisobutylene polymer.

In other embodiments, the adhesive composition comprises little or no polyisobutylene polymers that include functional groups. Thus, the concentration of functionalized polyisobutylene polymer(s) is typically less than 1 wt.-% of the adhesive composition.

Since the polyisobutylene does not include (meth)acrylate and vinyl ether functional groups in this embodiment, it is surmised that the multifunctional component is not covalently bonded to the polyisobutylene polymer component.

The polyisobutylene polymer can be characterized by molecular weight. As used herein, weight-average molecular weights are based on Gel Permeation Chromatography (GPC) utilizing polystyrene standards, per the test method described in previously cited U.S. patent application Ser. No. 62/479,527, filed Mar. 31, 2017.

In some embodiments, the adhesive core comprises a polyisobutylene polymer having a weight average molecular weight of at least 125,000 grams/mole ("g/mol"), at least 150000 g/mol, at least 200000 g/mol, or at least 245000 g/mol. In some embodiments, the weight average molecular weight of the polyisobutylene polymer is less than 800000 g/mol, less than 790000 g/mol, less than 780000 g/mol, or less than 770000 g/mol. In some embodiments, the polyisobutylene polymer has a weight average molecular weight of 150000 g/mol to 790000 g/mol, 200000 g/mol to 780000 g/mol, or 245000 g/mol to 770000 g/mol In some embodiments, adhesive core includes a blend of two or more polyisobutylene polymers, wherein each polyisobutylene polymer has a different weight average molecular weight (Mw).

For example, in some embodiments, the adhesive core comprises a first polyisobutylene polymer having a weight average molecular weight of 3000000 grams per mole (g/mol) to 2500000 g/mol (i.e., a high molecular weight polyisobutylene polymer) and a second polyisobutylene polymer having a weight average molecular weight of less than 300000 g/mol (i.e., a low molecular weight polyisobutylene polymer).

When the adhesive core includes two or more polyisobutylene polymers, the average weight average molecular weight of the adhesive core can be approximated by the summation of the average molecular weight of each polyisobutylene polymer multiplied by the weight fraction of each polyisobutylene polymer within the polyisobutylene component. For example, if the polyisobutylene component contains about 58 wt.-% of a first polyisobutylene polymer having a weight average molecular weight of 75,000 and about 25 wt.-% of a second polyisobutylene polymer having a weight average molecular weight of 500,000 g/mole, the average weight average molecular weight can be approximated as $75{,}000\times0.58+500{,}000\times0.25=168{,}500$ g/mole. Thus, in some embodiments, the polyisobutylene polymer component can comprise one or more polyisobutylene polymers such that the polyisobutylene polymer component has an average weight average molecular weight (Mw) of at least 125,000 g/mole, at least 150,000 g/mole, at least 200,000 g/mole, or at least 245,000 g/mole and ranging up to 800,000 g/mole; up to 790,000 g/mole, up to 780,000 g/mol, or up to 770,000 g/mole. More than one low molecular weight polyisobutylene polymers and more than one high molecular weight polyisobutylene polymers can be used in some embodiments.

The adhesive core typically comprises at least 20, 30, or 40 wt.-% of polyisobutylene polymer. In some embodiments the adhesive core comprises at least 45, 50, 55, or 60 wt.-% of polyisobutylene polymer. The polyisobutylene polymer component provides the desired water vapor transmission rate (WVTR) properties. In some embodiments, the WVTR of a 51 micron adhesive layer is less than 20 or 15 or 10 grams/square meter/day (g/sq·m/day) at 40° C. and 90% relative humidity gradient. In other words, the WVTR can be at least 0.2, 0.25, 0.3, 0.35, or 0.4 g/sq·m/day per micron thickness of adhesive. In other embodiments, the WVTR of a 20 micron adhesive layer at 40° C. and a relative humidity gradient is less than 100, 75, 50, 25, 20, or 15 $g/m^2$/day.

The combination of the low and high-molecular weight polyisobutylene resins may be particularly advantageous as the combination can provide a broad range of desirable characteristics. The low molecular weight polyisobutylene polymer facilitates processing during hot melt extruding, by lowering the melt viscosity of the compounded adhesive mixture. In solvent processing, the low molecular weight facilitates faster diffusion of solvent during drying, thus enabling thicker coatings. Also, the low molecular weight polyisobutylene polymer imparts conformability to an adhesive which enables ink step coverage, and proper wet-out on different surfaces. High molecular weight imparts cohesion to an adhesive system which improves the adhesive forces, shear strength, tensile strength, room temperature and high temperature dimensional stability.

The adhesive composition may optionally comprise one or more additives such as tackifiers, plasticizers (e.g. oils, polymers that are liquids at 25° C.), antioxidants (e.g., hindered phenol compounds, phosphoric esters, or derivatives thereof), ultraviolet light absorbers (e.g., benzotriazole, oxazolic acid amide, benzophenone, or derivatives thereof), in-process stabilizers, thermal stabilizers, anti-corrosives, passivation agents, processing aids, elastomeric polymers (e.g. block copolymers), scavenger fillers, nanoscale fillers, transparent fillers, desiccants, crosslinkers, pigments, etc. These additives may be used singly and in combination of two or more kinds thereof. The total concentration of such additives typically ranges from 1-70 wt.-% of the total adhesive composition.

When it is desired for the adhesive composition to be transparent, the adhesive core is typically free of fillers having a particle size greater than 100 nm that can detract from the transparency of the adhesive composition. In this embodiment, the total amount of filler of the adhesive composition is no greater than 10, 9, 8, 7, 6, 5, 4, 3, or 2 wt.-% solids of the adhesive composition. In some favored embodiments, the adhesive composition comprises no greater than 1, 0.5, 0.1, or 0.05 wt.-% of filler.

The adhesive core compositions disclosed herein may optionally comprise a tackifier. Addition of tackifiers allows the composition to have higher adhesion which can be beneficial for some applications where adhering to different substrates is a critical requirement. The addition of tackifiers increases the Tg of the composition and can reduce its storage modulus at room temperature, thus making it less elastic and more flowable, such as what is required for compliance to an ink step during lamination. However, that same addition of a tackifier can shift the visco-elastic balance too much towards the viscous behavior, such as in those cases where minimal creep and thus less flow is required. The addition of tackifiers is thus optional, and its presence and concentration are dependent on the particular application. In some embodiments, the core comprises 1 weight percent to 60 weight percent of the tackifier based on a total weight of the adhesive core Suitable tackifiers include hydrocarbon resins and hydrogenated hydrocarbon resins, e.g., hydrogenated cycloaliphatic resins, hydrogenated aromatic resins, or combinations thereof. Suitable tackifiers are commercially available and include, e.g., those available under the trade designation ARKON (e.g., ARKON P or ARKON M) from Arakawa Chemical Industries Co., Ltd. (Osaka, Japan); those available under the trade designation ESCOREZ (e.g., ESCOREZ 1315, 1310LC, 1304, 5300, 5320, 5340, 5380, 5400, 5415, 5600, 5615, 5637, and 5690) from Exxon Mobil Corporation, Houston, TX; and those available under the trade designation REGALREZ (e.g., REGALREZ 1085, 1094, 1126, 1139, 3102, and 6108) from Eastman Chemical, Kingsport, TN Because of their low color and environmental stability, these tackifiers are particularly advantageous for OCA type applications.

The tackifier can have any suitable softening temperature or softening point. The softening temperature is often less than 200° C., less than 180° C., less than 160° C., less than 150° C., less than 125° C., or less than 120° C. In applications that tend to generate heat or where the adhesive bond is exposed to heat, however, the tackifier is often selected to have a softening point of at least 75° C. Such a softening point helps minimize separation of the tackifier from the rest of the adhesive composition when the adhesive composition is subjected to heat such as from an electronic device or component. The softening temperature is often selected to be at least 80° C., at least 85° C., at least 90° C., or at least 95° C. In applications that do not generate heat or the adhesive bond is not exposed to heat, however, the tackifier can have a softening point less than 75° C.

In some embodiments the adhesive composition comprises a tackifier. The concentration of tackifier can vary depending on the intended adhesive composition. In some embodiments, the amount of tackifier is at least 1, 2, 3, 4, 5, 6, 7, 8, 9, 10, 11, 12, 13, 14, 15 wt.-%. The maximum amount of tackifier is typically no greater than 60, 55, 50, 45, 40, 35, or 30 wt.-%. Increasing the tackifier concentration typically raises the Tg of the adhesive.

Method of Printing

A method of printing a hot-melt processable adhesive is provided. The method includes forming a core-sheath filament as described above. The method further includes melting the core-sheath filament and blending the sheath with the core to form a molten composition. The method still further includes dispensing the molten composition through a nozzle onto a substrate. The molten composition can be formed before reaching the nozzle, can be formed by mixing in the nozzle, or can be formed during dispensing through the nozzle, or a combination thereof. Preferably, the sheath composition is uniformly blended throughout the core composition.

Fused filament fabrication ("FFF"), which is also known under the trade designation "FUSED DEPOSITION MODELING" from Stratasys, Inc., Eden Prairie, Minn., is a process that uses a thermoplastic strand fed through a hot can to produce a molten aliquot of material from an extrusion head. The extrusion head extrudes a bead of material in 3D space as called for by a plan or drawing (e.g., a computer aided drawing ("CAD") file). The extrusion head typically lays down material in layers, and after the material is deposited, it fuses.

One suitable method for printing a core-sheath filament comprising an adhesive onto a substrate is a continuous non-pumped filament fed dispensing unit. In such a method, the dispensing throughput is regulated by a linear feed rate of the core-sheath filament allowed into the dispense head. In most currently commercially available FFF dispensing heads, an unheated filament is mechanically pushed into a heated zone, which provides sufficient force to push the filament out of a nozzle. A variation of this approach is to incorporate a conveying screw in the heated zone, which acts to pull in a filament from a spool and also to create pressure to dispense the material through a nozzle. Although addition of the conveying screw into the dispense head adds cost and complexity, it does allow for increased throughput, as well as the opportunity for a desired level of component mixing and/or blending. A characteristic of filament fed dispensing is that it is a true continuous method, with only a short segment of filament in the dispense head at any given point.

There can be several benefits to filament fed dispensing methods compared to traditional hot-melt adhesive deposition methods. First, filament fed dispensing methods typically permits quicker changeover to different adhesives. Also, these methods do not use a semi-batch mode with melting tanks and this minimizes the opportunity for thermal degradation of an adhesive and associated defects in the deposited adhesive. Filament fed dispensing methods can use materials with higher melt viscosity, which affords an adhesive bead that can be deposited with greater geometric precision and stability without requiring a separate curing or crosslinking step. In addition, higher molecular weight raw materials can be used within the adhesive because of the higher allowable melt viscosity. This is advantageous because uncured hot-melt pressure sensitive adhesives containing higher molecular weight raw materials can have significantly improved high temperature holding power while maintaining stress dissipation capabilities.

The form factor for FFF filaments is usually a concern. For instance, consistent cross-sectional shape and longest cross-sectional distance (e.g., diameter) assist in cross-compatibility of the core-sheath filaments with existing standardized FFF filaments such as ABS or polylactic acid ("PLA"). In addition, consistent longest cross-section distance (e.g., diameter) helps to ensure the proper throughput of adhesive because the FFF dispense rate is generally determined by the feed rate of the linear length of a filament. Suitable longest cross-sectional distance variation of the core-sheath filament according to at least certain embodiments when used in FFF includes a maximum variation of 20 percent over a length of 50 cm, or even a maximum variation of 15 percent over a length of 50 cm.

Extrusion-based layered deposition systems (e.g., fused filament fabrication systems) are useful for making articles including printed adhesives in methods of the present disclosure. Deposition systems having various extrusion types of are commercially available, including single screw extruders, twin screw extruders, hot-end extruders (e.g., for filament feed systems), and direct drive hot-end extruders (e.g., for elastomeric filament feed systems). The deposition systems can also have different motion types for the deposition of a material, including using XYZ stages, gantry cranes, and robot arms. Common manufacturers of additive manufacturing deposition systems include Stratasys, Ultimaker, MakerBot, Airwolf, WASP, MarkForged, Prusa, Lulzbot, BigRep, Cosin Additive, and Cincinnati Incorporated. Suitable commercially available deposition systems include for instance and without limitation, BAAM, with a pellet fed screw extruder and a gantry style motion type, available from Cincinnati Incorporated (Harrison, OH); BETABRAM Model P1, with a pressurized paste extruder and a gantry style motion type, available from Interelab d.o.o. (Senovo, Slovenia); AM1, with either a pellet fed screw extruder or a gear driven filament extruder as well as a XYZ stages motion type, available from Cosine Additive Inc. (Houston, TX); KUKA robots, with robot arm motion type, available from KUKA (Sterling Heights, MI); and AXIOM, with a gear driven filament extruder and XYZ stages motion type, available from AirWolf 3D (Fountain Valley, CA).

Three-dimensional articles including a printed adhesive can be made, for example, from computer-aided drafting ("CAD") models in a layer-by-layer manner by extruding a molten adhesive onto a substrate. Movement of the extrusion head with respect to the substrate onto which the adhesive is extruded is performed under computer control, in accordance with build data that represents the final article. The build data is obtained by initially slicing the CAD model of a three-dimensional article into multiple horizontally sliced layers. Then, for each sliced layer, the host computer generates a build path for depositing roads of the composition to form the three-dimensional article having a printed adhesive thereon. In select embodiments, the printed adhesive comprises at least one groove formed on a surface of the printed adhesive. Optionally, the printed adhesive forms a discontinuous pattern on the substrate.

The substrate onto which the molten adhesive is deposited is not particularly limited. In many embodiments, the substrate comprises a polymeric part, a glass part, or a metal part. Use of additive manufacturing to print an adhesive on a substrate may be especially advantageous when the substrate has a non-planar surface, for instance a substrate having an irregular or complex surface topography. Before depositing molten adhesive to the surface of the substrate, the substrate is treated with one or more primers, as described above. The primer is typically applied as a solvent-borne liquid, by any suitable method, which may include, for example, brushing, spraying, dipping, and the like. In some embodiments, the substrate surface may be treated with one or more organic solvents (e.g., methyl ethyl ketone, aqueous isopropanol solution, acetone) prior to application of the primer.

The core-sheath filament can be extruded through a nozzle carried by an extrusion head and deposited as a sequence of roads on a substrate in an x-y plane. The extruded molten adhesive fuses to previously deposited molten adhesive as it solidifies upon a drop-in temperature. This can provide at least a portion of the printed adhesive. The position of the extrusion head relative to the substrate is then incremented along a z-axis (perpendicular to the x-y plane), and the process is repeated to form at least a second layer of the molten adhesive on at least a portion of the first layer. Changing the position of the extrusion head relative to the deposited layers may be carried out, for example, by lowering the substrate onto which the layers are deposited. The process can be repeated as many times as necessary to form a three-dimensional article including a printed adhesive resembling the CAD model. Further details can be found, for example, Turner, B. N. et al., "A review of melt extrusion additive manufacturing processes: I. process design and modeling"; Rapid Prototyping Journal 20/3 (2014) 192-204. In certain embodiments, the printed adhesive comprises an integral shape that varies in thickness in an axis normal to the substrate. This is particularly advantageous in instances where a shape of adhesive is desired that cannot be formed using die cutting of an adhesive. In some embodiments, it may desirable to apply only a single adhesive layer as it may be advantageous, for example, to minimize material use and/or reduce the size of the final bond line.

A variety of fused filament fabrication 3D printers may be useful for carrying out the method according to the present disclosure. Many of these are commercially available under the trade designation "FDM" from Stratasys, Inc., Eden Prairie, MN, and subsidiaries thereof. Desktop 3D printers for idea and design development and larger printers for direct digital manufacturing can be obtained from Stratasys and its subsidiaries, for example, under the trade designations "MAKERBOT REPLICATOR", "UPRINT", "MOJO", "DIMENSION", and "FORTUS". Other 3D printers for fused filament fabrication are commercially available from, for example, 3D Systems, Rock Hill, SC, and Airwolf 3D, Costa Mesa, CA.

In certain embodiments, the method further comprises mixing the molten composition (e.g., mechanically) prior to dispensing the molten composition. In other embodiments, the process of being melted in and dispensed through the nozzle may provide sufficient mixing of the composition such that the molten composition is mixed in the nozzle, during dispensing through the nozzle, or both.

The temperature of the substrate onto which the adhesive can be deposited may also be adjusted to promote the fusing of the deposited adhesive. In the method according to the present disclosure, the temperature of the substrate may be, for example, at least about 100° C., 110° C., 120° C., 130° C., or 140° C. up to 175° C. or 150° C.

The printed adhesive prepared by the method according to the present disclosure may be an article useful in a variety of industries, for example, the aerospace, apparel, architecture, automotive, business machines products, consumer, defense, dental, electronics, educational institutions, heavy equipment, jewelry, medical, and toys industries. The composition of the sheath and the core can be selected so that, if desired, the printed adhesive is clear.

EXAMPLES

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Missouri, or may be synthesized by known methods. The following abbreviations are used in this section: min=minutes, s=second, g=gram, mg=milligram, kg=kilogram, m=meter, centimeter=cm, mm=millimeter, μm=micrometer or micron, ° C.=degrees Celsius, ° F.=degrees Fahrenheit, N=Newton, oz=ounce, Pa=Pascal, MPa=mega Pascal, rpm=revolutions per minute, phr=parts per hundred, psi=pressure per square inch, cc/rev=cubic centimeters per revolution, $cm^3$=centimeters cubed, mol=mole Table 1 (below) lists materials used in the examples and their sources.

TABLE 1

| Material List | |
|---|---|
| DESIGNATION | DESCRIPTION |
| OPPANOL B15 | Polyisobutylene (Mwt~75 Kg/mol), obtained under the trade designation "OPPANOL B15" from BASF Corporation, Florham Park, NJ |
| OPPANOL N80 | Polyisobutylene (Mwt~750 Kg/mol), obtained under the trade designation "OPPANOL N80" from BASF Corporation, Florham Park, NJ |
| OPPANOL N100 | Polyisobutylene (Mwt~1000 Kg/mol), obtained under the trade designation "OPPANOL N100" from BASF Corporation, Florham Park, NJ |
| OPPANOL N150 | Polyisobutylene (Mwt~1500 Kg/mol), obtained under the trade designation "OPPANOL N150" from BASF Corporation, Florham Park, NJ |
| ESCOREZ 5340 | Hydrogenated Hydrocarbon Resin, obtained under the trade designation "ESCOREZ 5340" from ExxonMobil, Houston, TX |
| BR 268 | Butyl Rubber (Mwt~350 Kg/Mol), obtained under the trade designation "BR 268" from ExxonMobil, Houston, TX |
| LDPE | Low Density Polyethylene, obtained under the trade designation "PETROTHENE NA217000" from Lyondell Bassell, Houston, TX |

Test Procedures

Melt Flow Index Test Method

Samples were tested according to ASTM D1238 with a load of 2.16 kg at 190° C., the total number of grams expelled over a 10-minute period were massed and reported as g/10 min (grams per 10 minutes). An average of at least 8 samples was used for the reported value.

Filament Extrudability Test Method

For Core-Sheath Preparation Method 1: If the core could not be melted and/or extruded at the shear and temperature conditions (200 RPM, 300° F.), the sample was considered not extrudable.

For Core-Sheath Preparation Method 2: If the core could not be melted and mixed into a homogenous mixture at the shear and temperature conditions (60 RPM, 320° F.) in 5 minutes, the sample was considered not extrudable.

Filament Stability Test Method

The core-sheath filaments (prepared using both preparation methods) were stored at 25° C. for a week, during which the stability was observed; if the core appeared to leak through the surface or the face of the cylindrical filaments, then the filament was considered unstable.

Shear Strength Test Method

Shear tests were conducted using 12.7 mm wide adhesive tapes prepared in the examples. A stainless steel panel was cleaned by wiping (first with heptane and then with acetone) and drying. Tapes were applied to the panel such that a 12.7 mm by 25.4 mm portion of each adhesive tape was in firm contact with the panel and the trailing end portion of each tape was free (i.e. not attached to the panel). The panel with tape was held in a rack so that the panel formed an angle of 180° with the extended free end and a 500 g weight was attached to the free end. The test was conducted under controlled temperature and humidity conditions and the time elapsed for each tape to separate from the test panel was recorded as the shear strength in minutes. Three shear tests were performed for each adhesive sample and the results averaged.

Test Method for G' @25 C) and Tan Delta (@150° C.)

Adhesive samples pressed to 40 mils using a Carver press, as described in the section "ADHESIVE FORMATION FROM CORE-SHEATH FILAMENTS" were tested for both G' and Tan Delta. The equipment used was a Discovery Hybrid Rheometer (available from TA Instruments, New Castle, DE) or equivalent stress or strain-controlled air bearing rheometer, equipped with 8 mm 0-degree upper plate and lower plate within ECT (environmental chamber). The sample was held with a normal force of 30 g+/−40 g and was taken through a temperature sweep from −50° C. to 150° C. at 3° C./min. G' at 25° C. and tan delta at 150° C. were recorded.

Sample Preparation

Cores 1-6 (C1-C6) prepared using Preparation Method 1 are summarized in Table 2 and Cores 7-14 (C7-C14) prepared using Preparation Method 2 are summarized in Table 3 with preparations described below.

TABLE 2

Core compositions using Preparation Method 1

| Example | Core | N80 (wt %) | B15 (wt %) | N100 (wt %) | B268 (wt %) | Escorez 5340 (wt %) |
|---|---|---|---|---|---|---|
| E1 | C1 | 50 | 25 | | | 25 |
| E2 | C2 | 70 | | | | 30 |
| CE1 | C3 | 10 | 65 | | | 25 |
| CE2 | C4 | | | 80 | | 20 |
| E3 | C5 | 50 | | | 25 | 25 |
| E4 | C6 | | 25 | 50 | | 25 |

TABLE 3

Core compositions using Preparation Method 2

| Example | Core | B268 (wt %) | N80 (wt %) | N150 (wt %) | B15 (wt %) | Escorez 5340 (wt %) |
|---|---|---|---|---|---|---|
| E5 | C7 | | 50 | | 25 | 25 |
| E6 | C8 | | | 50 | 25 | 25 |
| E7 | C9 | | 50 | | | 50 |
| E8 | C10 | | | 50 | | 50 |
| E9 | C11 | | 75 | | 25 | |
| CE3 | C12 | | | | 50 | 50 |
| E10 | C13 | | | 30 | 70 | |
| E11 | C14 | 70 | | | | 30 |

Examples 1-11 (E1-E11) and Comparative Examples 1-3 (CE1-CE3) are summarized in Table 4 with preparations described below.

Preparation Method 1: Examples 1~4 (E1-E4) and Comparative Examples 1-2 (CE1-CE2)

Core-sheath filaments were made by co-extruding a non-tacky outer sheath layer around an inner PSA core, with the example compositions described in Table 4 below. The PSA core (C1-C6) was fed as cut slabs into a Bono-feeder (obtained from The Bonnot Company (Akron, Ohio)) and the melt stream (@ 200 rpm, 300° F.) was metered using a 3 cc/rev gear-pump (obtained from Colfax Corporation (Annapolis Junction, MD)). The non-tacky outer sheath (LDPE) was melted and extruded using a 19.1 mm single screw extruder (HAAKE brand, obtained from Thermo Fisher Scientific (Waltham, MA)). Both melt streams were fed into a co-axial die having a ~15 mm exit diameter. The PSA core was fed into the inner core layer of the coaxial die, while the non-tacky sheath material LDPE was fed into the outer sheath of the die; ultimately producing a core-sheath filament. The filament was drawn to 8 mm diameter through a water bath at room temperature (22° C.). The filaments were wound onto 75 mm diameter tubes for storage.

Preparation Method 2: Examples 5-11 (E5-E11) and Comparative Example 3 (CE3)

a) Preparation Method 2: Preparation of Core

The batch preparation of PSA cores C7-C14 was carried out using a Plasti-corder unit (obtained from Brabender, South Hackensack, NJ) equipped with an electrically heated three-part mixer with a capacity of approximately 55 $cm^3$ and high shear counter-rotating blades. The mixer was preheated to 160° C. and set at a mixing speed of 60 rpm and the PSA core components totaling 50 g were added directly to the top of the mixing barrel. The mixing operation was run for 5 minutes, at which time the mixture appeared homogeneous and transparent.

b) Preparation Method 2: Preparation of Sheath and Formation of Core-Sheath Filaments Films of non-tacky sheaths were prepared by hot melt pressing pellets of LPDE (or other film formers) to average thickness of 7-10 mils (0.1778-0.254 mm) in a Model 4389 hot press (Carver, Inc., Wabash) at 140° C. (284° F.). Rectangles of film 1.5 inch (3.77 cm) in width and 2.7-5.9 inch (7-15 cm) in length were cut and hand rolled to encircle the compounded core formulations (as described in part a) to yield a core/sheath filament 12 mm in diameter.

Adhesive Formation from Core-Sheath Filaments: All Examples 1-11 (EX1-11) and all Comparative Examples 1-3 (CE1-CE3)

For preparing adhesives out of the core-sheath filaments, core-sheath filaments prepared using both PREPARATION METHOD 1 & PREPARATION METHOD 2 were fed into a Brabender Plasti-corder (South Hackensack, NJ) unit equipped with an electrically heated three-part mixer with a capacity of approximately 55 $cm^3$ and high shear counter-rotating blades. The mixer was preheated to 160° C. and set at a mixing speed of 60 rpm and the core-sheath filaments were added directly to the top of the mixing barrel as three separate filaments totaling 50 g. The mixing operation was run for 5 minutes, at which time the mixture appeared homogeneous and transparent. Following this, the mixture is pressed to an average thickness of 5 mils in a Carver press at 140° C. for doing static shear measurements and 40 mils to do rheology (G' and Tan Delta) measurements.

TABLE 4

Examples 1-11 (E1-E11) and Comparative Examples 1-3 (CE1-CE3)

| Example | Core | Preparation Method | Sheath |
|---|---|---|---|
| E1 | C1 | 1 | LDPE |
| E2 | C2 | 1 | LDPE |
| CE1 | C3 | 1 | LDPE |
| CE2 | C4 | 1 | LDPE |
| E3 | C5 | 1 | LDPE |
| E4 | C6 | 1 | LDPE |
| E5 | C7 | 2 | LDPE |
| E6 | C8 | 2 | LDPE |
| E7 | C9 | 2 | LDPE |
| E8 | C10 | 2 | LDPE |
| E9 | C11 | 2 | LDPE |
| CE4 | C12 | 2 | LDPE |
| E10 | C13 | 2 | LDPE |
| E11 | C14 | 2 | LDPE |

Results

Melt Flow Index Measurements

For the sheath material used in Core-Sheath filament, the melt flow index was measured using Melt Flow Index Test Method described above and recorded in the literature as below:

TABLE 5

Melt Flow Index Value of Sheath Material

| Sheath | MFI Method | MFI (g/10 min) |
|---|---|---|
| NA217000 LDPE | Literature | 5.6 |

Compounded Core-Sheath Filament PSA Performance

Several tests were run on the final compounded PSA samples per the methods described above in the Test Methods Section. The results and measurements are reported below in Table 6 for those samples made using Preparation Method 1 (Examples 1~4 (E1-E4) and Comparative Examples 1-2 (CE1-2)) and in Table 7 for those made using Preparation Method 2 (Examples 5-11 (E5-E11) and Comparative Example 3 (CE3)).

TABLE 6

Compounded Filament PSA Performance for Method 1 Examples

| Sample id | Weight avg. molecular weight (g/mol) | Filament extrudability | Filament Stability | G' of Dispensed Filaments at 25° C. (kPa) | Tan Delta of Dispensed Filaments at 150° C. | Static Shear (mins) |
|---|---|---|---|---|---|---|
| E1 | 393,925 | Yes | Yes | 179 | 0.51 | 8657 |
| E2 | 525,210 | Yes | Yes | 261 | 0.42 | >10000 |
| CE1 | 123,925 | Yes | No | NA | NA | NA |
| CE2 | 800,140 | No | NA | NA | NA | NA |

TABLE 6-continued

Compounded Filament PSA Performance for Method 1 Examples

| Sample id | Weight avg. molecular weight (g/mol) | Filament extrudability | Filament Stability | G' of Dispensed Filaments at 25° C. (kPa) | Tan Delta of Dispensed Filaments at 150° C. | Static Shear (mins) |
|---|---|---|---|---|---|---|
| E3 | 462,675 | Yes | Yes | 218 | 0.44 | 9293 |
| E4 | 518,925 | Yes | Yes | 232 | 0.46 | >10000 |

TABLE 7

Compounded Filament PSA Performance for Method 2 Examples

| Sample | Weight Average Moecular Weight (g/mol) | Cigar Stability | G' of Adhesive at 25° C. (kPa) | Tan Delta of Adhesive at 150° C. | Static Shear (mins) |
|---|---|---|---|---|---|
| E5 | 393,925 | Yes | 187 | 0.48 | 9303 |
| E6 | 768,925 | Yes | 219 | 0.38 | >10000 |
| E7 | 375,350 | Yes | 179 | 0.54 | 6971 |
| E8 | 750,350 | Yes | 286 | 0.41 | >10000 |
| E9 | 581,250 | Yes | 233 | 0.68 | 5312 |
| CE3 | 37,850 | No | NA | NA | NA |
| E10 | 502,500 | Yes | 237 | 0.69 | 4812 |
| E11 | 245,210 | Yes | 119 | 0.72 | 3119 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A core-sheath filament comprising:

a non-tacky sheath, wherein the non-tacky sheath exhibits a melt flow index of less than 15 grams per 10 minutes (g/10 min); and an adhesive core, wherein the adhesive core comprises:

a polyisobutylene polymer having a weight average molecular weight of 150000 grams per mole (g/mol) to 790000 g/mol.

2. The core-sheath filament of claim 1, wherein the non-tacky sheath comprises LDPE.

3. The core-sheath filament of claim 1, wherein the core-sheath filament comprises 1 to 10 weight percent sheath and 90 to 99 weight percent hot-melt processable adhesive core based on a total weight of the core-sheath filament.

4. The core-sheath filament of claim 1, wherein the adhesive core comprises 10 weight percent to 60 weight percent of the polyisobutylene polymer based on a total weight of the adhesive core.

5. The core-sheath filament of claim 1, wherein the polyisobutylene polymer comprises a first polyisobutylene polymer having a weight average molecular weight of 3000000 grams per mole (g/mol) to 2500000 g/mol and a second polyisobutylene polymer having a weight average molecular weight of less than 300000 g/mol.

6. The core-sheath filament of claim 1, wherein the adhesive core further comprises an additive selected from the group consisting of a tackifier, a plasticizer, and anti-oxidant, a thermal stabilizer, a crosslinker, and combinations thereof.

7. The core-sheath filament of claim 6, wherein the adhesive core comprises 1 weight percent to 60 weight percent of the tackifier based on a total weight of the adhesive core.

8. The core-sheath filament of claim 7, wherein the tackifier comprises a cycloaliphatic hydrocarbon.

9. The core-sheath filament of claim 1, wherein the adhesive core is a pressure-sensitive adhesive.

10. An adhesive composition comprising the core-sheath filament of claim 1, the adhesive composition being a product resulting from compounding the core-sheath filament through a heated extruder nozzle.

11. The adhesive composition of claim 10, wherein the adhesive composition has a Tan Delta 0.1 to 0.99, 0.2 to 0.9, 0.3 to 0.8, or 0.35 to 0.75 as measured by the Test Method for Tan Delta at 150° C.

12. The adhesive composition of claim 10, wherein the adhesive composition exhibits a static shear performance of greater than 1000 minutes, greater than 2500 minutes, greater than 5000 minutes, greater than 7500 minutes, or greater than 10000 minutes as measured by the Shear Strength Test Method.

* * * * *